United States Patent [19]

Yamamoto et al.

[11] 4,076,073
[45] Feb. 28, 1978

[54] COMBINATION RE-CONDITIONING UNIT AND ILLUMINATING APPLIANCE FOR USE WITH CENTRAL AIR CONDITIONING SYSTEM

[75] Inventors: Toshio Yamamoto; Jyoji Kamata; Shigeo Murase; Kouichirou Yamaguchi, all of Kadoma, Japan

[73] Assignee: Matsushita Electric Industrial Co., Ltd., Japan

[21] Appl. No.: 652,155

[22] Filed: Jan. 26, 1976

[30] Foreign Application Priority Data

Feb. 18, 1975 Japan .................................. 50-20521

[51] Int. Cl.² .............................................. F24D 5/10
[52] U.S. Cl. .................... 165/53; 98/40 DL; 62/506; 62/259
[58] Field of Search ...................... 165/48–54; 62/259 R, 259 T, DIG. 16; 98/40 DL

[56] References Cited

U.S. PATENT DOCUMENTS

| | | | |
|---|---|---|---|
| 2,962,266 | 11/1960 | Kritzer | 165/50 |
| 3,415,073 | 12/1968 | Ammons | 165/53 |
| 3,420,439 | 1/1969 | Meckler | 165/53 |
| 3,867,980 | 2/1975 | Traver | 165/54 |
| 3,945,432 | 3/1976 | Tamblyn | 165/50 |
| 3,949,808 | 4/1976 | Gilles | 165/50 |

Primary Examiner—Albert W. Davis, Jr.
Assistant Examiner—Theophil W. Streule, Jr.
Attorney, Agent, or Firm—Robert E. Burns; Emmanuel J. Lobato; Bruce L. Adams

[57] ABSTRACT

A central air conditioning system for a multistory, multiroom building is arranged with a local re-conditioning unit mounted within a ceiling chamber of the building and combined with an illuminating appliance. Air in the space to be air conditioned is admitted to the re-conditioning unit through an air inlet opening formed in the illuminating appliance and is withdrawn from the re-conditioning unit into the space to be air conditioned through an air outlet opening also formed in the illuminating appliance.

31 Claims, 12 Drawing Figures

COMBINATION RE-CONDITIONING UNIT AND ILLUMINATING APPLIANCE FOR USE WITH CENTRAL AIR CONDITIONING SYSTEM

BACKGROUND OF THE INVENTION

The present invention relates in general to air conditioning systems and particularly to a central air conditioning system arranged with local re-conditioning units. More particularly, the present invention is concerned with a combination of such a local air conditioning unit and an illuminating appliance for installation on a ceiling structure of a relatively large-sized building.

While the central air conditioning system incorporating the improvement according to the present invention may be useful for the comfort cooling and heating of residential buildings and premises or for district air conditioning purposes, the same will prove advantageous particularly when installed in relatively large-sized, multiroom and/or multistory structures such as business, commercial, industrial, institutional or public buildings as will be understood as the description proceeds.

The capabilities, performance characteristics and dimensional details of a single-duct central air conditioning system are usually determined in the process of planning and designing the building in which the air conditioning system is to be installed. When the building is completed and transferred to the client or to tenants of the client from the contractor, it is usual that the users of the building have the floors or the existing compartments of each of the floors partitioned into sections and subsections depending upon the purposes for which the floor spaces are to be utilized. This results in change in the distribution of conditioning air supplied from the central conditioning unit and circulated through the spaces in the floors. The draughts of air into the spaces to be conditioned therefore vary from one section or subsection to another and, in the worst case, there will be such sections or subsections that are not directly ventilated from the distribution ductwork of the air conditioning system and are thus not or, at most, only poorly air conditioned. Such localized distribution of conditioning air also results from the sensible loads located in the space or spaces to be air conditioned, such as heat-emanating or heat-absorbing equipment and appliances, illumination for the space or spaces, and gains or losses of heat due to solar and sky radiation through the envelope of the building such as the roof structure, exterior walls, window panes and other kinds of skins.

To remedy the localized distribution of the conditioning air, it has been an ordinary practice to have the air distribution ductwork of the conditioning system locally re-arranged so as to compensate for the change in the load. This will compel the owner or the tenants of the building to incur extra expenses. Because, moreover, the ductwork is re-arranged only locally for the purpose of saving the cost and because of the fact that the central air conditioning unit per se is usually not re-adjusted or exchanged, the initially designed balance in the operation of the system tends to be destroyed even after the ductwork is re-arranged and, as a consequence, there will still exist sections or subsections which are only poorly air conditioned or the capacity of the system per se will become short of meeting the total demand of the building. For the purpose of providing a solution to these problems inherent in the central air conditioning system of the single-duct design, it has been proposed to have the central air conditioning system arranged with supplementary local air re-conditioning units so that the conditioning air is "zoned" to the individual spaces to be air conditioned. The local re-conditioning units are mounted within ceiling chambers of the building, using the chambers as part of the air distribution ductwork. A problem however arises in mounting the local re-conditioning units within the ceiling chambers because it frequently happens that the areas optimum for locating the re-conditioning units have been occupied or designed to be occupied by illuminating appliances for the rooms to be air conditioned and limit the range of selection of the locations available for the installation of the re-conditioning units. The performance of the local re-conditioning units must therefore be sacrificed if priority is given to the illuminating appliances. Ceiling or attic mounted air conditioners per se are well known in the art from, for example, U.S. Pat. Nos. 2,682,757, 2,770,955, 2,817,217 and 3,625,022. None of the prior art air conditioners taught in these issued patents aims at providing a solution to the problems above pointed out. The air conditioner disclosed in each of the patents uses outdoor air as a source of heat or as a medium to be heated by the rejected heat and basically differs in principle of operation from the local air re-conditioning unit combined with the central air conditioning system in that the re-conditioning unit is operative to exchange heat with the air which has once been heated or cooled by the central air conditioning system and which has been circulated through the space or spaces to be air conditioned.

The present invention contemplates elumination of the above described problems encountered in the prior art air re-conditioning units which are used supplementarily to the central air conditioning system of, typically, the single-duct design.

SUMMARY OF THE INVENTION

It is, therefore, an object of the present invention to provide a combination of a local re-conditioning unit for use with a central air conditioning system adapted to use a ceiling chamber of a building as part of the ductwork for the return air of the central conditioning system and an illuminating appliance for installation in the ceiling chamber through an opening formed in the ceiling panel forming the ceiling chamber. In accordance with the present invention, the re-conditioning unit combined with such an illuminating appliance is adapted for installation within the ceiling chamber above the opening in the ceiling panel and comprises casing means formed with a plurality of separate chambers which are arranged in series in longitudinal direction of the casing means and which include a conditioning chamber for circulating therethrough air from the space below the ceiling panel and back into the space and a heat-transfer chamber for passing therethrough air from the ceiling chamber and back into the ceiling chamber. The casing means is further formed with an air inlet opening located at the bottom of the conditioning chamber and at least one air outlet opening located at the bottom of the casing means. On the other hand, the illuminating appliance is positioned immediately below the casing means of the re-conditioning unit for having its lower end exposed to the space below the ceiling panel through the opening in the panel and has an air inlet opening which is upwardly in communication with the air inlet opening in the casing means and at least one air outlet opening which is upwardly in communication with the air outlet opening in the casing means and which is open at the lower end of the illuminating appliance to the space below the ceiling panel through the opening in the ceiling panel.

BRIEF DESCRIPTION OF THE DRAWINGS

The features and advantages of the combination re-conditioning unit and illuminating appliance according to the present invention will become more apparent from the following description taken in conjunction with the accompanying drawings, in which like reference numerals designate corresponding structures, units, pars and spaces and in which.

DESCRIPTION OF THE PREFERRED EMBODIMENTS

Figure 1:
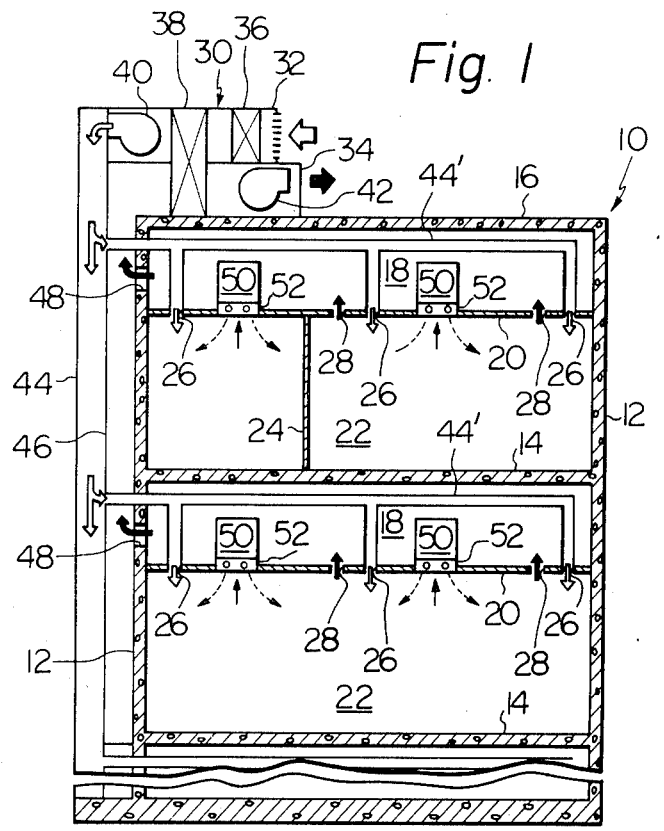
FIG. 1 is a fragmentary vertical sectional view of a multistory, multiroom building on which a single-duct central air conditioning system arranged with the combination local re-conditioning unit and illuminating appliance according to the present invention is installed.

Referring to the drawings, first to FIG. 1, a central air conditioning system is shown installed on a multi-story, multiroom building 10. The building 10 is assumed, by way of example, as being of a concrete construction and is shown comprising a load-carrying frame structure including external vertical walls 12 of reinforced concrete and floor and roof structures 14 and 16 each of which may be made up of a slab of concrete on beams of steel or concrete as is customary. Each of the floors thus formed between the floor structures 14 or between the floor and roof structures 14 and 16 has a ceiling structure having a ceiling chamber 18 formed between a horizontal ceiling panel 20 and the underside of the floor or roof structure 14 or 16 above the ceiling panel 20. A room 22 is thus provided between each of the floor structures and each of the ceiling panels 20. One of the rooms 22 is shown divided by a vertical partition member 24 into sections which are spatially separate from each other. The ceiling panel 20 above each of the floors is formed with air inlet and outlet openings 26 and 28 through which the conditioning air is to be circulated into and out of the space or spaces to be air conditioned as will be described. The construction of the building 10 herein described and shown is merely by way of example and is immaterial for the understanding of the subject matter of the present invention. It may, however, be noted that the building 10 has a ceiling structure in each of the floors thereof.

The single-duct central air conditioning system installed on the building 10 thus constructed comprises a central air conditioning unit 30 which is shown mounted on the top of roof structure 16. The conditioning unit 30 comprises air intake and discharge ducts 32 and 34 open to the atmosphere, heat exchangers 36 and 38 to cool or heat the intake air drawn into the unit 30 through the air intake duct 32, an air supply fan 40 to feed the conditioning air into the distribution ductwork, and an air discharge fan 42 positioned in the air discharge duct 34 for discharging the used air to the atmosphere. Though not shown, the central conditioning unit 30 has further built therein air filters, a motor-driven refrigeration compressor and so forth, as is customary. The distribution ductwork comprises a main supply duct 44 leading from the discharge side of the air supply fan 40 and a plurality of branch ducts 44' leading from the main supply duct 44. The branch ducts 44' extend through the ceiling chambers 18 and are open into the individual rooms 22 through the air inlet openings 26 in the ceiling panels 20, as shown. The ceiling chambers 18 are in communication with a return duct 46 through openings 48 formed in the vertical wall 12 of the load-carrying frame structure. The return duct 46 terminates in the discharge duct 34.

When the central air conditioning unit 30 is in operation on the cooling or heating cycle thereof, cold or hot air delivered from the central conditioning unit is directed through the main and branch ducts 44 and 44' and blows downwardly into the rooms 22 to be air conditioned through the openings 26 in the ceiling panels 20. The cold or hot air is circulated through each of the rooms 22 is upwardly withdrawn from the room through the air outlet opening or openings 28 in the ceiling panel 20 above the room and enters the ceiling chamber 18. The used air thus entering the ceiling chambers 18 in the individual floors is passed through the openings 48 in the vertical wall 12 into the return duct 46 and is discharged into the open air through the air discharge duct 34 by means of the discharge fan 42. The air in the return duct 46 may be in part recirculated into the mixing chamber in the conditioning unit 30 by means of a recirculation air damper (not shown) positioned windward of the air discharge fan 42 especially on the heating cycle of the conditioning unit for re-use of the heat in the recirculated air.

The central air conditioning system thus arranged is designed so that the draughts of the conditioning air into the individual rooms to be conditioned are substantially uniform. As previously noted, however, the latent and sensible load vary from one of the rooms 22 to be conditioned to another due to, for example, the placement of heat-emanating or heat-absorbing equipment and appliances, illumination for the rooms and the gains or losses of heat as caused by solar and sky radiation. It therefore sometimes happens that the draughts of the conditioning air into some of the rooms 22 to be conditioned become short of meeting the demands of the rooms.

This problem becomes particularly serious if the room 24 is divided into separate sections by the partition member 24 so that one of the sections is void of the air inlet opening 26 and/or the air outlet opening 28 in the ceiling panel 20, as in the case of the uppermost room in the shown building 10.

With a view to overcoming such a problem, local re-conditioning units 50 are provided for some or all of the rooms 22 to be air conditioned. The re-conditioning units 50 are located within the ceiling chambers 18 and are operative to cool or heat air which has been supplied from the central air conditioning system and circulated through the rooms 22 and to supply the re-conditioned air into the rooms 22. The re-conditioning unit 50 is typically constituted by an air-to-air heat pump extracting heat from or liberating heat into the air being passed through the ceiling chambers 18 from the air outlet openings 28 in the ceiling panel 20. As previously mentioned, however, the locations most desirable for the installation of the re-conditioning units 50 over the ceiling panels 20 are sometimes coincident with those which are most desirable for the installation of ceiling-mounted illuminating appliances 52 on the panels. If, therefore, the re-conditioning units 50 are located off the illuminating appliances 52, then the performance of the re-conditioning units 50 would be lessened and as a consequence the designed cooling or heating performances of the units could not be exploited satisfactorily. To avoid this problem, the present invention proposes to have the local re-conditioning units 50 constructed and arranged to be suitable for installation immediately above the illuminating appliances 52 and, furthermore, have the illuminating appliances constructed and arranged to be compatible, spatially and in effect, with such local re-conditioning units 50.

Figure 2:
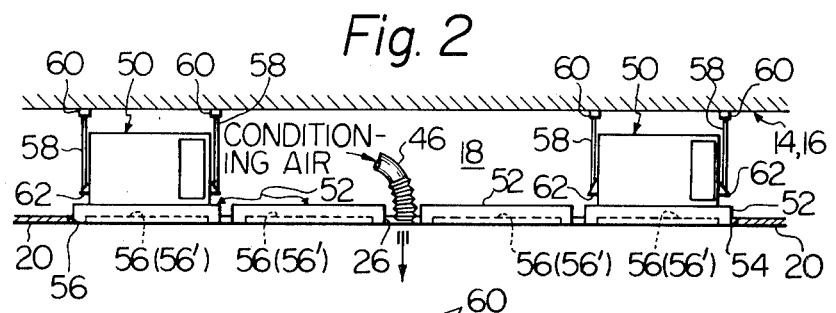
FIG. 2 is a front elevational view showing, to an enlarged scale, a general arrangement of the combination re-conditioning unit and illuminating appliance according to the present invention.
Figure 3:
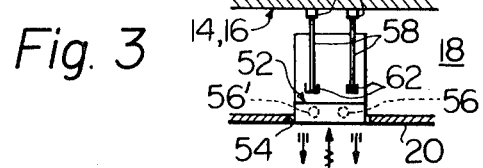
FIG. 3 is a side elevational view of such an arrangement.

FIGS. 2 and 3 illustrate a general configuration of the combinations of the local re-conditioning units 50 and the illuminating appliances 52 thus constructed and arranged and installed within the ceiling chamber 18 which is utilized as part of the ductwork to direct the used air from the room 22 into the return duct. The ceiling panel 20 forming the ceiling chamber 18 under the floor or roof structure 14 or 16 is formed with an elongated opening 54 having a width which is slightly larger than the overall width of the illuminating appliances 52. Each of the illuminating appliances 52 is of the type having a pair of spaced, parallel tubular fluorescent lamps 56 and 56'. The illuminating appliances are positioned longitudinally in series along the elongated opening 54 in such a manner that the appliances have their respective lower ends substantially flush with the underside of the ceiling panel 20, as shown. Each of the re-conditioning units 50 is suspended from the floor or roof structure 14 or 16 by means of hanging bolts 58 which are screwed at their upper ends into anchor nuts 60 driven into the slab of the structure 14 or 16 and rigidly connected at their lower ends to brackets 62 secured to the re-conditioning unit. As will be described in more detail, the illuminating appliances 52 underlying the individual re-conditioning units 50 are detachably secured to the lower ends of the re-conditioning units by suitable fastening means by which the vertical positions of the illuminating appliances relative to the re-conditioning units 50 and accordingly to the ceiling panel 20 are adjustable.

Figure 4:
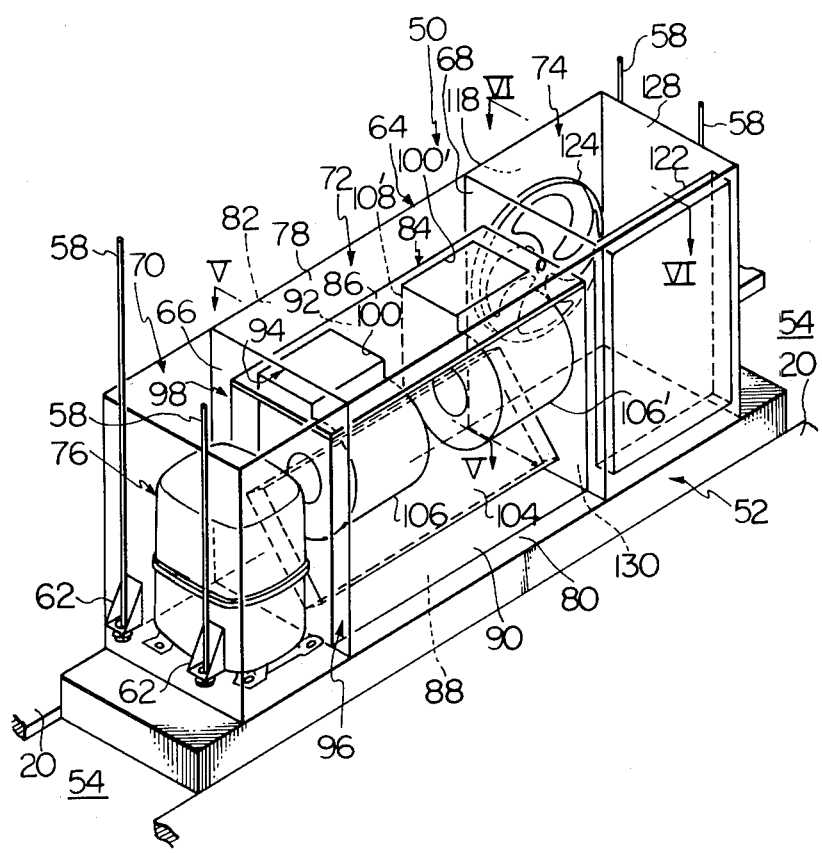
FIG. 4 is a perspective view showing a preferred embodiment of the combination re-conditioning unit and illuminating appliance according to the present invention.
Figure 5:
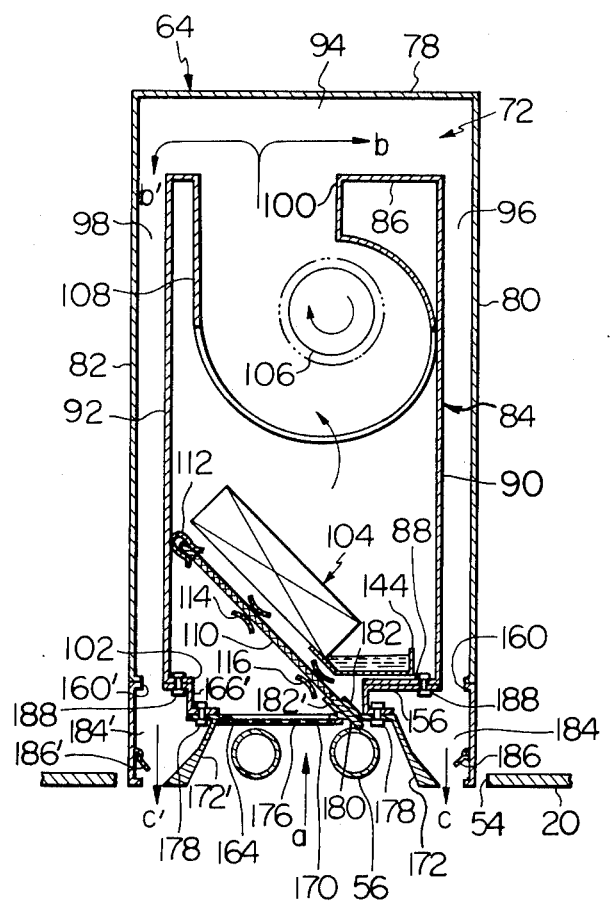
FIG. 5 is a cross sectional view taken along lines V—V of FIG. 4.
Figure 6:
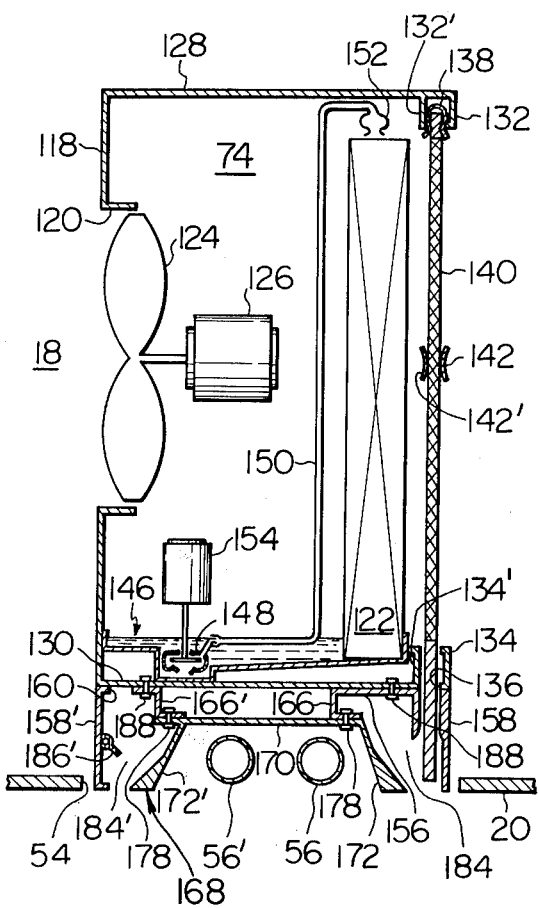
FIG. 6 is a cross sectional view taken along lines VI—VI of FIG. 4.

Turning to FIGS. 4 to 6, each of the local re-conditioning units 50 comprises a casing 64 which is internally divided by vertical partition members 66 and 68 into three separate chambers consisting of a refrigeration compressor chamber 70, a conditioning chamber 72 and a heat-transfer chamber 74. The chambers 70, 72 and 74 are located in side-by-side relationship to each other over and in longitudinal direction of the elongated opening 54 in the ceiling panel 20, as will be best seen in FIG. 4. A refrigeration compressor 76 is positioned within the chamber 70. The casing 64 is open at the bottom of the conditioning chamber 72 and has a horizontal upper wall portion 78 at the top of the conditioning chamber 72 and vertical front and rear wall portions 80 and 82 which are spaced in parallel from each other for defining the conditioning chamber therebetween and between the above-mentioned partition members 66 and 68. Within the conditioning chamber 64 is positioned an inner casing 84 which has horizontal upper and lower wall portions 86 and 88 and vertical front and rear wall portions 90 and 92. The upper wall portion 86 of the inner casing 84 is downwardly spaced in parallel from the lower face of the upper wall portion 78 of the outer casing 64 and forms a horizontal space 94 between the wall portions 78 and 86. The lower wall portion 88 of the inner casing 84 is substantially flush with the lower end of the outer casing 64. The front and rear wall portions 90 and 92 of the inner casing 84 are inwardly spaced apart in parallel from the inner faces of the front and rear wall portions 80 and 82, respectively, of the outer casing 64 so that vertical front and rear spaces 96 and 98 are formed between the front wall portions 80 and 90 of the outer and inner casings 64 and 84 and between the rear wall portions 82 and 92 of the casings 64 and 84, as best seen in FIG. 5. The front and rear spaces 96 and 98 have upper ends contiguous to the horizontal space 94 and are open at their lower ends which are flush with the lower end of the outer casing 64. All the spaces 94, 96 and 98 horizontally terminate at the inner faces of the partition members 66 and 68. The upper wall portion 86 of the inner casing 84 is formed with openings 100 and 100' which are spaced apart from each other in parallel with the front and rear ends of the wall portion 86 and which are preferably located closer to the rear end of the wall portion 86 as shown in FIGS. 4 and 5 for the reason which will become clear as the description proceeds. On the other hand, the lower wall portion 88 of the inner casing 84 is formed with an opening 102 which is elongated in parallel with the front and rear ends of the wall portion 88 and which preferably extends substantially throughout the length of the wall portion 88, viz., between the inner faces of the partition members 66 and 68. The elongated opening 102 is preferably located closer to the rear end of the wall portion 88 as will be clearly seen in FIG. 5, similarly to the above-mentioned openings 100 and 100' in the upper wall portion 86.

Within the conditioning chamber 72 thus arranged is positioned a heat exchanger 104 which may be constituted by a finned coil ordinarily used as a heating or cooling coil in an air-to-air heat pump. The heat exchanger 104 is positioned over the elongated opening 102 in the lower wall portion 88 of the inner casing 84 and preferably extends throughout the length of the conditioning chamber 72, viz., between the inner faces of the partition members 66 and 68. The heat exchanger 104 is preferably inclined at a predetermined angle to a horizontal plane so as to have its rear end and to have its front end angularly raised located slightly above the upper face of the lower wall portion 88 of the inner casing 84. Though not shown in the drawings, the heat exchanger 104 is connected through a suitable shift valve (which usually is a four-way two-position valve) between the refrigerant compressor 76 and an expansion valve by means of suitable piping arrangement passed through the partition member 66. A refrigerant is thus passed through the heat exchanger 104 toward or from the compressor 76 on the cooling or heating cycle of the re-conditioning unit 50. During the cooling cycle, the heat exchanger 104 is connected at the outgoing end of its coil to the suction side of the compressor 76 through the shift valve in one position and is operated as a refrigerant evaporator. When the re-conditioning unit 50 is operated on the heating cycle, the heat exchanger 104 is connected at the incoming end of the coil to the delivery side of the compressor 76 through the shift valve in the other position and thus functions as a refrigerant condenser as is well known in the art of heat pumps.

Above the heat exchanger 104 thus arranged are positioned motor-driven centrifugal or paddle-wheel fans 106 and 106' having air delivery ducts 108 and 108' terminating at the openings 100 and 100', respectively, in the upper wall portion 86 of the casing 84. The centrifugal fans 106 and 106' have aligned horizontal axes of rotation parallel with the front and rear wall portions 90 and 92 of the casing 84 and are adapted to induce flows of air from the elongated opening 102 in the lower wall portion 88 of the casing 84 toward the openings 100 and 100' in the upper wall portion 86 upwardly through the heat exchanger 104 and the ducts 108 and 108'. The draught of air thus withdrawn upwardly through the openings 100 and 100' into the horizontal space 94 below the upper wall portion 86 of the casing 84 is divided into two streams flowing from the space 94 into the vertical front and rear spaces 96 and 98 between the outer and inner casings 64 and 84 as indicated by arrows *b* and *b'*, respectively, in FIG. 5. If desired, the fans 106 and 106' thus arranged may be replaced with a single centrifugal fan (not shown) having an axis of rotation having opposite ends in the vicinity of the inner faces of the partition members 66 and 68. In this instance, the upper wall portion 96 of the inner casing 84 may be preferably formed with an elongated opening above such a fan. As an alternative to the centrifugal fan or fans thus having the axis or axes of rotation extending in longitudinal direction of the conditioning chamber 72, one or more axial-flow fans (not shown) having a vertical axis or axes may be positioned above the heat exchanger 104 or within the horizontal space 94 above the conditioning chamber 72. Still alternatively or in combination with any of the fan or fans arranged in the above described fashion, a fan of any type may be positioned in each of the vertical front and rear spaces 96 and 98 between the outer and inner casings 64 and 66. If the single fan or all of the two or more fans are located outside the inner casing 84, the upper wall portion 86 may be removed from the casing 84 or may be open substantially throughout its horizontal area.

Below the heat exchanger 104 is positioned an air filter 110 of panel form. The air filter 110 is also inclined to a horizontal plane and which is thus substantially parallel and coextensive with the underside of the heat exchanger 104 as is seen in FIG. 5. The air filter 110 is detachably retained at its uppermost rear end to an elongated horizontal clip member 112 mounted on the rear wall portion 92 of the inner casing 84 and has an intermediate portion elastically received between a pair of slip guides 114 which are assumed to be secured to the partition members 66 and 68 though not shown. The filter 110 has a lower end portion projecting downwardly at a predetermined angle to a horizontal plane from the elongated opening 102 in the lower wall portion 88 of the inner casing 84. The lower portion of the filter 110 is elastically received between a pair of slip members 116.

As best seen in FIG. 6, the outer casing 64 is open at the front end of the heat-transfer chamber 74 and has a rear wall portion 118 defining the rear end of the heat-transfer chamber 74. The rear wall portion 118 is formed with an opening 120 through which the heat-transfer chamber 74 is in constant communication with the ceiling chamber 18. Within the heat-transfer chamber 74 thus arranged is accommodated a heat exchanger 122 which is vertically positioned in proximity to the open front end of the heat-transfer chamber 74. The heat-transfer chamber 74 has further accommodated therein an axial-flow fan 124 which is driven by a motor 126 for rotation about a horizontal axis substantially normal to the heat exchanger 122 and which is located in proximity to the above-mentioned opening 120 in the rear wall portion 118 of the casing 64. The fan 124 is adapted to induce a flow of air from the open front end of the heat-transfer chamber 74 toward the opening 120 in the rear wall portion 118 and further from the opening 120 into the ceiling chamber 18. It is apparent that the axial-flow fan 124 may be replaced with a centrifugal or paddle-wheel fan (not shown) having a horizontal axis of rotation parallel with the rear wall portion 118, if desired. The casing 64 further has horizontal upper and lower wall portions 128 and 130 defining the upper and lower ends, respectively, of the heat-transfer chamber 74. The upper wall portion 128 has formed along its front end a pair of spaced parallel edges 132 and 132' which project downwardly from the inner face of the wall portion 128. Likewise, the lower wall portion 130 of the casing 64 has formed along its front end a pair of spaced parallel edges 134 and 134' projecting upwardly from the upper face of the wall portion 130. The upper edges 132 and 132' are in alignment with the lower edges 134 and 134', respectively, across the front open end of the heat-transfer chamber 74 as shown. The lower wall portion 130 of the casing 64 is further formed with an elongated slot 136 between the lower edges 134 and 134' and open at the lower end of the lower wall portion 130. An elongated clip member 138 is fixedly positioned between the upper edges 132 and 132' and extends throughout the length of the edges which are assumed to extend substantially between the vertical ends of the open front end of the heat-transfer chamber 74 as will be seen from FIG. 4. An air filter 140 of panel form is detachably retained along its upper end to the clip member 138 between the upper edges 132 and 132' and is vertically suspended from the clip member 138, closing the total open area at the front end of the heat-transfer chamber 74. The air filter 140 has a lower end portion which is passed through the elongated slot 136 in the lower wall portion 130 of the casing 64 and projects downwardly from the underside of the lower wall portion 130. The filter 140 has a vertically intermediate portion elastically received between slip guides 142 and 142' which may be secured to the side wall portions defining the lateral ends of the open front end of the heat-transfer chamber 74, one of such side wall portions being constituted by the previously mentioned partition member 66 between the conditioning and heat-transfer chambers 72 and 74 (FIG. 4).

The heat-exchanger 122 positioned within the heat-transfer chamber 74 is connected through the previously mentioned shift valve between the refrigerant compressor 76 in the chamber 70 and the expansion valve by suitable piping arrangement (not shown) which may be passed through the partition member 66. The heat exchanger 122 is connected at the incoming end of its coil to the delivery side of the compressor 76 through the shift valve in one position and thus functions as a refrigerant condenser on the cooling cycle of the re-conditioning unit 50. During the heating cycle of the re-conditioning unit 52, the heat exchanger 122 is connected at the outgoing end of the coil to the suction side of the compressor 76 and is operated as a refrigerant evaporator. The compressor 76, heat exchangers 104 and 122, shift valve and expansion valve make up a closed loop for circulating the refrigerant therethrough and constitutes an air-to-air refrigerant-flow reversible heat pump. During cooling cycle of the heat pump, the compressor 76 delivers a hot compressed refrigerant of a gaseous phase to the refrigerant condenser or heat exchanger 122 in the heat-transfer chamber 74. The refrigerant is condensed in the heat exchanger 122 into a liquid state and gives up the latent heat of condensation to the air being circulated through the heat-transfer chamber 74 by the axial-flow fan 124. From the heat exchanger 122 thus serving as the refrigerant condenser, the liquid refrigerant flows through the expansion valve to the evaporator or heat exchanger 104 in the conditioning chamber 72. The liquid refrigerant is changed in the heat exchanger 104 into a gas, thereby absorbing the heat of evaporation from the air being passed through the conditioning chamber 72 by the centrifugal fans 106 and 106'. From the heat exchanger 104, the refrigerant gas is returned to the compressor 76 so as to repeat the cycle. During heating cycle of the heat pump, the refrigerant compressor 76 delivers the hot refrigerant gas to the heat exchanger 104 in the conditioning chamber 72, in which the refrigerant gas is condensed into a liquid state and liberates the latent heat of condensation into the air passed through the heat exchanger 104 serving as a condenser. The liquid refrigerant flows from the heat exchanger 104 to the heat exchanger 122 in the heat transfer section through the expansion valve and is changed into a gas, extracting the heat of evaporation from the air passed through the heat exchanger 122 which serves as an evaporator. From the heat exchanger 122 in the heat-transfer chamber 74, the refrigerant gas is returned to the compressor 76 for repeating the cycle. The heat pump is thus operative, either on the cooling cycle or on the heating cycle, to exchange heat between the air being circulated through the heat-transfer chamber 74 in the ceiling chamber 18 and the air which is passed through the conditioning chamber 72 from and back into the space to be air conditioned.

The re-conditioning unit 50 thus arranged is shown to be further provided with means adapted to positively vaporizing the water condensate which will be produced onto the external surfaces of the finned coil of the heat exchanger 104 which functions as the refrigerant evaporator during the cooling cycle of the re-conditioning unit 50. The vaporizing means comprise a collecting basin 144 (FIG. 5) positioned below the lower front end of the heat exchanger 104 in the conditioning chamber 72 and a vaporizing basin 146 (FIG. 6) which is positioned at the bottom of the heat-transfer chamber 74 and which is in communication with the collecting basin 144 through a conduit (not shown) passed through the partition member 66. The water condensate produced onto the surfaces of the heat exchanger 104 and collected in the collecting basin 144 in the conditioning chamber 72 during the cooling cycle of the re-conditioning unit 50 is conducted into the vaporizing basin 146 in the heat-transfer chamber 74 and is vaporized by the heat in the air which has passed through the heat exchanger 122 serving as the refrigerant condenser. To cause the water in the vaporizing basin 146 to be vaporized at an increased rate, a pump 148 may be positioned within the vaporizing basin 146. The pump 148 has a delivery side connected to a conduit 150 terminating in a nozzle 152 which is open above the upper end of the heat exchanger 122. The pump 148 is driven by a motor 154 and feeds the water from the basin 146 to the nozzle 152 through the conduit 150, ejecting the water onto the top surfaces of the heat exchanger 122 operating as the refrigerant condenser.

Figure 7:
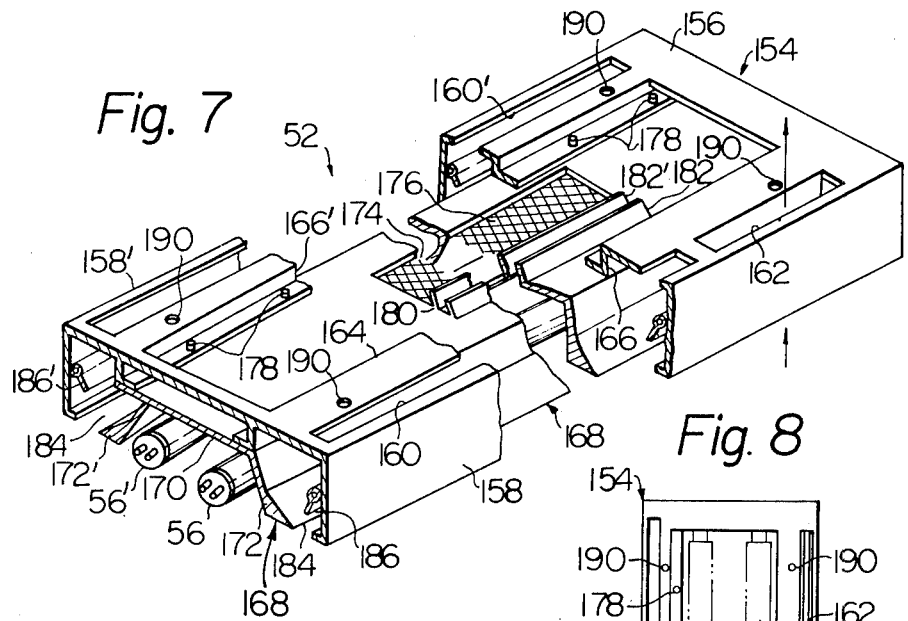
FIG. 7 is a partially taken-away perspective view showing the illuminating appliance forming part of the embodiment illustrated in FIGS. 4, 5 and 6.
Figure 9:
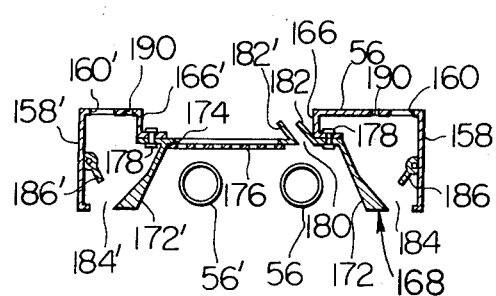
FIG. 9 is a section on line IX—IX of FIG. 8.
Figure 8:
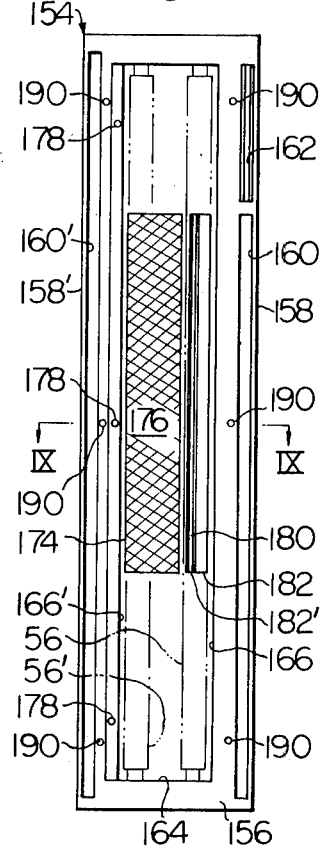
FIG. 8 is a bottom plan view of the illuminating appliance shown in FIG. 7.

Referring to FIGS. 7 to 9 as well as FIGS. 4 and 5, the illuminating appliance 52 combined with the local re-conditioning unit thus constructed and arranged comprises a support structure which is generally designated by reference numeral 154. The support structure 154 comprises a horizontal upper wall portion 156 and a pair of spaced, parallel, vertical wall portions 158 and 158' projecting downwardly from the front and rear longitudinal ends of the wall portion 156. The upper wall portion 156 is formed with elongated slots 160 and 162 extending along the front longitudinal end of the wall portion 156 and an elongated slot 160' extending along the rear longitudinal end of the wall portion 156. One elongated slot 160 along the front longitudinal end of the wall portion 156 has a length substantially equal to the sum of the lengths of the compressor and conditioning chambers 70 and 72 of the casing 64 of the re-conditioning unit 50 and the other elongated slot 162 along the front longitudinal end of the wall portion 156 is longitudinally spaced apart from the slot 160 and is substantially equal in length to the heat-transfer chamber 74 of the re-conditioning unit 50. The slots 160 and 162 are so located in the wall portion 156 as to be respectively aligned in vertical direction with the front vertical space 96 in the conditioning chamber 72 and the slot 134 at the front bottom end of the heat-transfer chamber 74 of the re-conditioning unit 50 when the illuminating appliance 52 is held in a predetermined position below the re-conditioning unit 50 as will be seen from FIGS. 5 and 6. On the other hand, the elongated slot 160' extending along the rear longitudinal end of the upper wall portion 156 of the support structure 154 has a length which is substantially equal to the length of the casing 64 of the re-conditioning unit 50 or, more exactly, the sum of the lengths of the chambers 70, 72 and 74 of the casing 64. When the illuminating appliance 52 is held in the above-mentioned predetermined position relative to the re-conditioning unit 50, the slot 160' has its intermediate portion located below the rear vertical space 94 in the conditioning chamber 72 of the unit 50, as will be seen from FIG. 5. The upper wall portion 156 of the support structure 154 is further formed with an opening 164 extending between and in parallel with the slots 160, 160' and 162. If desired, the opening 164 may be formed only in that area of the wall portion 156 which is to be located below the opening 102 in the lower wall portion 88 of the conditioning chamber of the re-conditioning unit 50 when the illuminating appliance 52 is held in the above-mentioned predetermined position under the unit 50. The upper wall portion 156 of the support structure 154 has formed on its lower face a pair of projections 166 and 166' which are spaced apart in parallel from the inner faces of the front and rear vertical wall portions 158 and 158', respectively.

The support structure 154 has fixedly but detachably mounted on the projections 166 and 166' a reflector 168 which extends substantially throughout the length of the support structure 154 and which consists of a horizontal upper panel portion 170 and a pair of spaced parallel vertical panel portions 172 and 172' projecting downwardly from the lower face of the upper panel portion 170. The upper panel portion 170 is downwardly spaced apart in parallel from the lower face of the upper wall portion 156 of the support structure 154 and is formed with an elongated opening 174. The elongated opening 174 is so sized and located in the panel portion 170 as to be substantially coextensively under the elongated opening 102 in the lower wall portion 88 of the conditioning chamber 72 of the re-conditioning unit 50, as will be best seen in FIG. 5. A meshed or perforated sheeting 176 such as a wire mesh is detachably mounted on the lower face of the upper panel portion 170 and covers the opening 174 in the panel portion. The reflector 168 thus constructed is connected to the support structure 154 by suitable adjustable fastening means such as screws or bolts 178 fastening the upper panel portion 170 of the reflector 168 to the lower projections 166 and 166' of the upper wall portion 156 of the re-conditioning unit 50. The vertical position of the reflector 168 relative to the support structure 154 is adjusted by the fastening means.

The reflector 168 is further formed with an elongated slot 180 in its upper panel portion 170. The elongated slot 180 extends in parallel with the elongated opening 174 in the panel portion 170 and is so located as to pass therethrough the lower end portion of the previously mentioned air filter 110 positioned within the conditioning chamber 72 of the re-conditioning unit 50 to which the illuminating appliance 52 is attached, as will be seen in FIGS. 5 and 9. The upper panel portion 170 of the reflector 168 is shown in FIGS. 5, 7 and 8 to be further formed with a pair of spaced parallel guide portions 182 and 182' projecting upwardly from the longitudinal ends of the slot 180. The guide portions 182 and 182' are inclined to slidably receive therebetween the lower end portion of the air filter 110.

The support structure 154 has sockets (not shown) carried at its opposite ends and the previously mentioned tubular fluorescent lamps 56 and 56' have the pins of its caps disconnectably fitted to the sockets. The lamps 56 and 56' thus mounted on the support structure 154 extend horizontally in parallel between the front and rear vertical panel portions 172 and 172' of the reflector 168. The panel portions 172 and 172' are inclined to be spaced wider apart from each other toward their lower ends, forming longitudinal spaces 184 and 184' on both sides of the panel portions 172 and 172'. One longitudinal space 184 is formed between the outer face of the front panel portion 172 and the inner face of the front vertical wall portion 158 of the support structure 154 and has an upper end which is contiguous in part to the elongated slot 160 and in part to the elongated slot 162 in the upper panel portion 170 of the reflector 168, and the other space 184' is formed between the outer face of the rear panel portion 172' of the reflector 168 and the inner face of the rear vertical wall portion 158' of the support structure 154 and has an upper end which is contiguous to the elongated slot 160' in the upper panel portion 170 of the reflector 168, as will be best seen in FIG. 7. The spaces 184 and 184' thus extend substantially throughout the lengths of the support structure 154 and the reflector 168 and have open lower ends. When the illuminating appliance 52 is fitted to the re-conditioning unit 50, the air filter 122 positioned at the front end of the heat-transfer chamber 74 of the re-conditioning unit 50 has its lower end portion downwardly extending into the front space 184 through the elongated slot 162 in the upper panel portion 170 of the support structure 154. Designated by 186 and 186' are air-flow deflector blades which are mounted on the inner faces of the front and rear vertical wall portions 158 and 158', respectively, of the support structure 154 and which are rotatable about pivotal shafts parallel with the wall portions 158 and 158'. The illuminating appliance 50 thus arranged is detachably fitted to the lower wall portions of the casing 64 of the re-conditioning unit 50 by suitable fastening means such as bolts 188 (FIG. 5) which are screwed through internally threaded holes 190 (FIG. 7) formed in the upper wall portion 156 of the support structure 154 of the illuminating appliance 52.

The re-conditioning unit 50 and the illuminating appliance 52 having the constructions thus far described are installed within the ceiling chamber 18 in the following manners, wherein reference is made concurrently to FIGS. 1 to 9.

The anchor nuts 60 are first driven into the slab of the floor or roof structure 14 or 16 above the elongated opening 54 in the ceiling panel 20. The hanging bolts 58 are then fitted at their upper ends to the anchor nuts 60 in the slab. The re-conditioning unit 50 complete with the air filters 110 and 122 is thereafter lifted above the opening 54 in the ceiling panel 20 and the hanging bolts 58 depending from the slab are securely connected at their lower ends to the brackets 62 on the casing 64 of the re-conditioning unit 50 in such a manner that the unit 50 is horizontally positioned over the opening 54. The re-conditioning unit 50 to be installed in the ceiling chamber 18 may be separate from the illuminating appliance 52 so as to be fitted with the appliance upon completion of the installation of the re-conditioning unit. As an alternative, the re-conditioning unit 50 may be fitted with the support structure 154 alone of the illuminating appliance 52 before the re-conditioning unit 50 is installed in the ceiling chamber 18. In this instance, the reflector 168 to form part of the illuminating appliance 52 should be mounted on the support structure 154 on the casing 64 of the re-conditioning unit 50 by means of the bolts or screws 178 upon completion of the installation of the re-conditioning unit. If the illuminating appliance 52 need not be mounted on the re-conditioning unit 50, then a meshed or perforated panel (not shown) tailored to the unit may be attached to the lower wall portion 88 of the casing 64 of the re-conditioning unit 50.

When the re-conditioning unit 50 and the illuminating appliance 52 are thus installed together within the ceiling chamber 18 as illustrated in FIGS. 1 and 2, the longitudinal spaces 184 and 184' in the illuminating appliance 52 are open at their lower ends to the space under the opening 54 in the ceiling panel 20 and are upwardly in communication with the front and rear vertical spaces 96 and 98 within the conditioning chamber 72 in the casing 64 of the re-conditioning unit 50 through the elongated slots 160 and 160' in the upper wall portion 156 of the support structure 154 of the illuminating appliance 52, as seen in FIG. 5. Furthermore, the space below the upper panel portion 170 of the reflector 168 of the illuminating appliance 52 is in communication with the windward side of the air filter 110 and the heat exchanger 104 within the inner casing 84 in the conditioning chamber 72 of the re-conditioning unit 50 through the meshes or pores in the meshed or perforated sheeting 176. When, therefore, the local re-conditioning unit 50 is in operation on the cooling or heating cycle thereof, air in the space below the ceiling panel 20 is caused to enter the windward side of the air filter 110 and the heat exchanger 104 through the meshed or perforated sheeting 176 as indicated by an arrow $a$ in FIG. 5 by the draught of air induced in the inner casing 64 by means of the centrifugal fans 106 and 106'. The air which has passed through the heat exchanger 104 is forced out of the inner casing 84 into the upper space 94 between the upper wall portions 78 and 86 of the outer and inner casings 64 and 84. The draught of air in the upper space 94 is divided into two streams as indicated by the arrow $b$ and $b'$ toward the upper ends of the vertical spaces 96 and 98 on both sides of the inner casing 84. The streams of air advance downwardly through the vertical spaces 96 and 98 under the influence of the back pressure exerted by the fans 106 and 106' and blow into the space under the illuminating appliance 52 through the elongated slots 160 and 160' in the upper wall portion 156 in the support structure 154 and the longitudinal spaces 184 and 184' below the slots 160 and 160' as indicated by arrows $c$ and $c'$, respectively in FIG. 5.

During use of the re-conditioning unit 50, dusts contained in the air passed through the conditioning chamber 72 are collected and deposited on the air filter 110 and likewise dusts contained in the air circulated through the heat-transfer chamber 74 are collected and deposited on the air filter 122. It is thus necessary to have the air filters 110 and 122 arranged to be removable from the re-conditioning unit 50 for cleaning thereof. The air filter 110 for the conditioning chamber 72 can be removed from re-conditioning unit 50 by first disconnecting the lamp 56 below the slot 180 in the upper panel portion 170 of the reflector 168, and pulling the filter 110 at its lower end slightly projecting downwardly from the slot 180 so that the filter 110 is disengaged from the clip member 112 and downwardly slides between the slip guides 114 and 116 within the conditioning chamber 72 and further between the guide portions 182 and 182' of the support structure 154. The filter 110 can be fitted into the initial position thereof upon completion of the cleaning thereof by following the above described steps in a reverse sequence with the lamp 56 below the slot 180 kept dismantled from the support structure 154. When the filter 110 is moved into the initial position thereof, the lamps 56 are fitted to the support structure 154. The slot 180 in the upper panel portion 170 of the reflector 168 is thus invisible from above the illuminating appliance 52 with the lamp 56 located immediately below the slot 180. On the other hand, the air filter 122 for the heat-transfer chamber 74 can be removed from the casing 64 of the re-conditioning unit 50 simply by downwardly pulling the filter 122 at its lower end projecting into the front longitudinal space 184 in the illuminating appliance 52 so that the filter 122 is disengaged at its upper end from the clip member 132 and slides down between the slip guides 142 and 142' and through the elongated slot 162 in the support structure 154 of the illuminating appliance 52. It is, in this instance, apparent that the lamp 56 need not be removed from the support structure 154. The air-flow deflecting blade 186 on the front vertical wall portion 158 of the support structure 154 terminates immediately ahead of the slot 162 so as not to interfere with the downward movement of the air filter 122 through the front longitudinal space 184.

The air-flow deflector blades 186 and 186' are used to downwardly direct the streams of air blowing into the space to be air conditioned from the longitudinal spaces 184 and 184' in the illuminating appliance 52 especially when the re-conditioning unit 50 is operated as a space heater for enabling the hot air to uniformly circulate in the space to be air conditioned. Since, in this instance, the space between the vertical panel portions 172 and 172' of the illuminating appliance 52 is longitudinally coextensive with the longitudinal spaces 814 and 184' on the outer sides of the panel portions 172 and 172', the air flowing downwardly out of the spaces 184 and 184' tends to be mixed with the air flowing upwardly into the space between the panel portions 172 and 172', causing a "short circuit" between the incoming air and the outgoing air. To prevent this from occurring, arrangement may be made so that the vertical spaces 96 and 98 are in communication with the space below the illuminating appliance 52 only through those portions of the longitudinal spaces 184 and 184' which extend between the lateral ends of the appliance 52 and the vertical planes passing through the lateral ends of the opening 174 in the upper panel portion 170 of the reflector 168. This may be accomplished by provision of two partition members (not shown) in each of the longitudinal spaces 184 and 184' for isolating such portions of the spaces 184 and 184' from the longitudinally intermediate portions of the spaces or by closing the lower ends of the intermediate portions of the spaces 184 and 184'. As an alternative, the upper panel portion 172 of the reflector 168 may be formed with two openings in its portions close to the lateral ends thereof in lieu of the opening 174 located substantially in an intermediate portion of the panel portion 170. An example of such an arrangement is illustrated in FIGS. 10 to 12.

Figure 10:
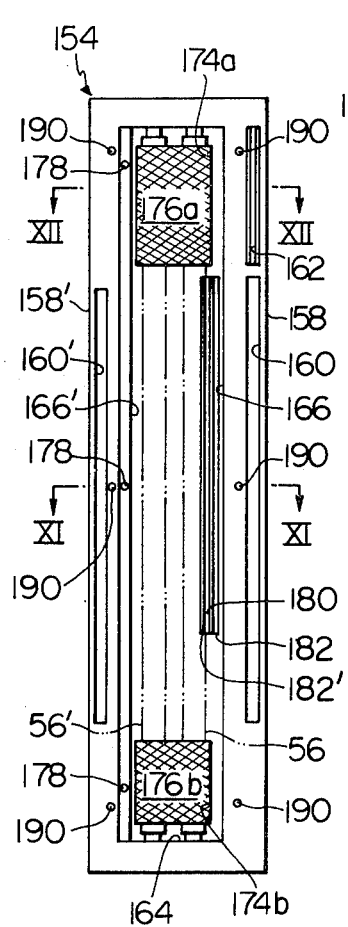
FIG. 10 is a view similar to FIG. 8 but shows another preferred example of the illuminating appliance forming part of the combination re-conditioning unit and illuminating appliance embodying the present invention.
Figure 11:
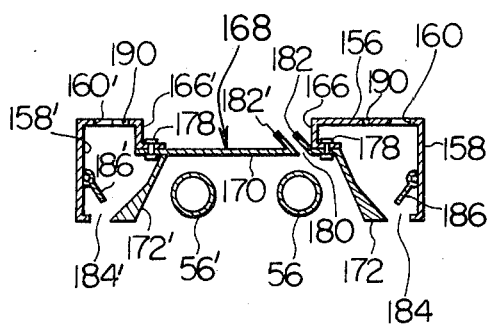
FIG. 11 is a cross section taken on line XI—XI of FIG. 10.
Figure 12:
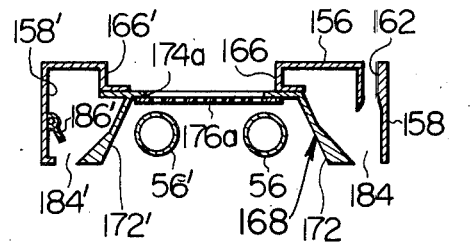
FIG. 12 is a cross section taken on line XII—XII of FIG. 10.

Referring to FIGS. 10 to 12, the elongated slots 160 and 160' is formed only in a longitudinally intermediate portion of the upper wall portion 156 of the support structure 154 of the illuminating appliance 52 and, in addition, the upper panel portion 170 of the reflector 168 is formed with first and second openings 174$a$ and 174$b$ in its lateral end portions, viz., in those portions which are located longitudinally outwardly of the planes passing through the opposite lateral ends of the slots 160 and 160' thus arranged. The openings 174$a$ and 174$b$ are covered with meshed or perforated sheetings 176$a$ and 176$b$, respectively, which are detachably mounted on the lower face of the upper panel portion 170 of the reflector 168. Communication is thus provided between the space under the upper panel portion 156 of the support structure 154 and the lower end of the conditioning chamber 72 (FIG. 4) through the meshes or pores in each of the meshed or perforated sheetings 176$a$ and 176$b$ and the horizontal, elongated opening 102 in the upper panel portion 170. The lower open ends of the longitudinal spaces 184 and 184' each formed between each of the vertical wall portions 158 and 158' of the support structure 154 and each of the vertical panel portions 172 and 172' of the reflector 168 are thus longitudinally located off the inlet openings 174a and 174b in the upper panel portion 156 of the reflector 168 so that the draughts of air downwardly withdrawing out of the longitudinal spaces 184 and 184' are spatially isolated from the stream of air being sucked into the conditioning chamber 72 (FIG. 4) through the meshed or perforated sheetings 176a and 176b. The air upwardly passed through the meshed or perforated sheetings 176a and 176b flows longitudinally through the space between the upper panel portion 170 of the reflector 168 and the lower wall portions of the casing 64 of the re-conditioning unit 50 and upwardly enters the windward or lower end portion of the chamber in the inner casing 84 within the conditioning chamber 72 (FIGS. 4 and 5).

From the foregoing description it will be appreciated that the present invention provides the following advantages when put into practice in a building installed with a central air-conditioning system of, for example, a single-duct type:

1. The re-conditioning unit 52 has a slim construction easy for integration with an illuminating appliance using tubular fluorescent lamps because the compressor, conditioning and heat-transfer chambers 70, 72 and 74 in the casing 64 are arranged longitudinally of the casing 64.

2. The illuminating appliance 52 can be sized to conform to the standardized modules of ordinary illuminating appliances using tubular fluorescent lamps because the slots 160 and 162, openings 164 and 174 and longitudinal spaces 184 and 184' formed in the support structure 154 and the reflector 168 thereof are all elongated in the longitudinal direction of the appliance.

3. By reason of the slim constructions, the re-conditioning unit 50 and the illuminating appliance can be readily installed, in combination, within a ceiling chamber of a multistory, multiroom building without recourse to re-design of the ceiling panel or the fittings attached to the ceiling panel.

4. Since the re-conditioning unit 52 can be located over such an area that is allocated for the placement of an illuminating appliance, the re-conditioning unit 50 installed within the ceiling chamber creates no limitation in partitioning or re-partitioning the space of the room below the unit.

5. The re-conditioning unit 50 has its lower end not exposed to the room below the ceiling panel and is invisible from below the illuminating appliance 50, providing an excellent external appearance of the ceiling when viewed from below the ceiling panel.

6. The air being sucked into the re-conditioning unit 50 from the space to be air conditioned blows on the hot lamps of the illuminating appliance 50 and cools the lamps, providing an increased illumination efficiency of the lamps.

7. The re-conditioning unit 50 and the illuminating appliance 52 can be installed all from below the opening in the ceiling panel and, furthermore, the maintenance and servicing of the re-conditioning unit 50, especially the air filters 110 and 122 can be made all from below the illuminating appliance 52.

What is claimed is:

1. In a building having a wall structure and a central air conditioning system and with at least one ceiling chamber having the bottom defined by a ceiling panel, a combination of one of re-conditioning units for use with said central air conditioning system including a main air supply duct communicating with spaces below said ceiling panel through ducts passing through said ceiling chamber and openings formed in said ceiling panel and an air return duct communicating with said ceiling chamber through at least one opening formed in said wall structure and an illuminating appliance for installation in the ceiling chamber through an opening formed in the ceiling panel which forms the ceiling chamber, said re-conditioning unit being installed within the ceiling chamber above said opening in the ceilng panel and comprising casing means formed with a plurality of separate chambers which are arranged in series longitudinally of said casing means and which include a conditioning chamber having blower means for circulating therethrough air from the space below said ceiling panel and back into the space below and a heat-transfer chamber having heat exchange means therein for passing therethrough and conditioning air from said ceiling chamber and back into the ceiling chamber, said casing means further having an air inlet opening located at the bottom of said conditioning chamber and at least one air outlet opening located at the bottom of the casing means, and said illuminating appliance being positioned immediately below said casing means and having its lower end exposed to said space below the ceiling panel through said opening in the ceiling panel and having an air inlet opening upwardly in communication with said air inlet opening in said casing means and at least one air outlet opening upwardly in communication with said air outlet opening in said casing means and which is open at the lower end of the illuminating appliance to the space below the ceiling panel.

2. A combination as set forth in claim 1, in which said casing means comprises an outer casing having wall portions defining said conditioning chamber and an inner casing positioned within said conditioning chamber for forming between the outer and inner casings passageway means for providing said air inlet and outlet openings in said casing means, said re-conditioning unit having said heat exchanger means located in said passageway means.

3. A combination as set forth in claim 2, in which said outer casing is open at its lower end and said inner casing has a lower wall portion at the bottom of said conditioning chamber, said air inlet opening being formed in said lower wall portion of the inner casing.

4. A combination as set forth in claim 2, in which said outer casing is open at its lower end and said inner casing has wall portions spaced apart from the inner surfaces of said outer casing defining a horizontal space above the inner casing and at least one vertical space merging downwardly from said horizontal space and terminating at the lower end in said air outlet opening of the re-conditioning unit.

5. A combination as set forth in claim 2, in which said inner casing has a lower wall portion at the bottom of said re-conditioning unit, said air inlet opening of the re-conditioning unit being formed in said lower wall portion and said heat exchanger being positioned substantially above the air inlet opening in said lower wall portion.

6. A combination as set forth in claim 5, in which said re-conditioning unit has an air filter of generally panel form, said air filter being positioned below said heat exchanger and above said air inlet opening in said lower wall portion of said inner casing.

7. A combination as set forth in claim 1, in which said illuminating appliance comprises a support structure detachably fastened to said casing means of said re-conditioning unit and a reflector detachably fastened to said support structure, said air inlet opening of the illuminating appliance being formed in said support structure and said air outlet opening of the illuminating appliance being defined between the lower ends of said support structure and said reflector.

8. A combination as set forth in claim 7, in which said support structure has a substantially horizontal wall portion positioned below said casing means, and air inlet opening of the illuminating appliance being disposed in said horizontal wall portion.

9. A combination as set forth in claim 8, in which said support structure has at least one substantially vertical wall portion projecting downwardly from said horizontal wall portion, said air outlet opening of the illuminating appliance being defined between said vertical wall portion and said reflector.

10. A combination as set forth in claim 9, in which said reflector has a substantially horizontal panel portion below said air inlet opening in said horizontal wall portion of said support structure and comprises an opening through which said air inlet opening of the illuminating appliance is downwardly open to the space below said ceiling panel.

11. A combination as set forth in claim 10, in which said reflector further has at least one generally vertical panel portion projecting downwardly from said horizontal panel portion and spaced apart from said vertical wall portion of said support structure for defining between the vertical wall portion and the vertical panel portion a space which has an upper end contiguous to said air outlet opening of said re-conditioning unit and a lower end open to the space below said ceiling panel, said air outlet opening of said illuminating appliance being constituted by said lower end of said space between said vertical wall portion and said vertical panel portion.

12. A combination as set forth in claim 11, in which said space between said vertical wall portion and said vertical panel portion extend longitudinally of said illuminating appliance.

13. A combination as set forth in claim 12, in which said space between said vertical wall portion and said vertical panel portion extends substantially throughout the length of said illuminating appliance.

14. A combination as set forth in claim 13, in which said opening in said horizontal panel portion is located below said conditioning chamber.

15. A combination as set forth in claim 13, in which said opening in said horizontal panel portion is located in a longitudinally intermediate portion of the horizontal panel portion.

16. A combination as set forth in claim 12, in which said horizontal wall portion has an elongated slot in a longitudinal direction of the wall portion, said upper end of said space between said vertical wall portion and said vertical panel portion being contiguous to said slot.

17. A combination as set forth in claim 16, in which said slot extends substantially throughout length of said horizontal panel portion.

18. A combination as set forth in claim 17, in which said opening in said horizontal panel portion is located in a longitudinally intermediate portion of the horizontal panel portion.

19. A combination as set forth in claim 16, in which said slot extends in a longitudinally intermediate portion of said horizontal panel portion.

20. A combination as set forth in claim 19, in which said opening in said horizontal panel portion is located in a longitudinally end portion of said horizontal panel portion.

21. A combination as set forth in claim 7, in which said re-conditioning unit further comprises a heat exchanger positioned within said conditioning chamber and above said air inlet opening of the re-conditioning unit and an air filter of generally panel form positioned below said heat exchanger, said support structure of said illuminating appliance being formed with an elongated slot for providing an access to said filter from below said support structure.

22. A combination as set forth in claim 21, in which said support structure has a substantially horizontal wall portion below said air inlet opening in said casing means of the re-conditioning unit, said elongated slot being formed in said horizontal wall portion.

23. A combination as set forth in claim 22, in which said horizontal wall portion comprises a pair of spaced parallel guide portions extending generally upwardly from said elongated slot for slidably receiving therebetween a portion of said filter.

24. A combination as set forth in claim 23, in which said filter and said guide portions are inclined to relative to said horizontal wall portion.

25. A combination as set forth in claim 1, in which said heat-transfer chamber has a substantially vertical air inlet opening and in which said re-conditioning unit further comprises an air filter of generally panel form located outwardly of said air inlet opening of the heat-transfer chamber.

26. A combination as set forth in claim 25, in which said casing means has a lower wall portion provided with an elongated slot for vertically passing therethrough a lower portion of said air filter.

27. A combination as set forth in claim 26, in which said illuminating appliance comprises an elongated slot aligned with said slot in said lower wall portion of said casing means for vertically passing therethrough a further lower portion of said air filter.

28. A combination as set forth in claim 27, in which said slots extend in a longitudinal direction of said casing means.

29. A combination as set forth in claim 27, in which said air filter has a lower end located above and in the vicinity of said air outlet opening of said illuminating appliance.

30. A combination as set forth in claim 1, in which said re-conditioning means further comprise a collecting vessel positioned within said conditioning chamber for collecting therein the water condensate produced in the conditioning chamber, a vaporizing vessel positioned within said heat-transfer chamber and communicating with said collecting vessel for storing the water condensate conducted from the collecting vessel into the vaporizing vessel and allowing the water condensate to be vaporized from the vaporizing vessel.

31. A combination as set forth in claim 1, in which said central air conditioning system is of a single-duct type.

* * * * *